United States Patent Office 2,896,002
Patented July 21, 1959

2,896,002

PROCESS FOR THE SEPARATION OF A MIXTURE OF CYCLOHEXANE AND BENZENE

Georges Jules Pierre Souillard, Brussels, Belgium, assignor to Institut Francais du Petrole des Carburants et Lubrifiants, Paris, France No Drawing. Original application July 19, 1951, Serial No. 237,674, now Patent No. 2,707,197, dated April 26, 1955. Divided and this application April 4, 1955, Serial No. 499,219

Claims priority, application France July 22, 1950

2 Claims. (Cl. 260—666)

This invention relates to a process for the separation of a mixture of cyclohexane and benzene wherein benzene is in minor proportion, and is a division of my copending application Serial No. 237,674, filed July 19, 1951, now patent No. 2,707,197, issued April 26, 1955.

Cyclohexane prepared by catalytic hydrogenation (Raney nickel, for instance) is not easily obtained in a pure state, since the last portions of benzene can only be hydrogenated with great difficulty. In order to get an approximately total transformation it would be necessary to perform the hydrogenation during a very long time. On the other hand, benzene and cyclohexane have very close boiling points and form an ideal mixture; so, one cannot hope to separate the last traces of benzene by any physical method. Thus it is more advantageous to continue hydrogenation to the point where it begins to become difficult, than to treat the mixture by chlorinating the benzene catalytically.

It is first necessary to know the proportion of benzene in the cyclohexane to be chlorinated. One may take the density the refractive index or the melting point. Reference is then made to curves of density of refractive index or of melting point for benzene-cyclohexane mixtures.

Knowing the quantity of benzene in the mixture, the quantity of chlorine necessary to transform all the benzene into a chlorinated product may be evaluated. It must be remembered that before all the benzene is transformed into monochlorobenzene the latter begins to change into dichlorobenzene; according to the work of MacMullin (Chemical Engineering Progress 44 (3), 183–88, March 1948), which gives the distribution curve of the products of the chlorination of benzene, during a catalytic chlorination approximately 1.5 mol. of $Cl_2$ against 1 mol. of $C_6H_6$ is necessary so that all the benzene is transformed into chlorinated products; in practice, it is good to feed 2 mol. of $Cl_2$ against 1 mol. of $C_6H_6$.

In tests made by the inventor, iron was chosen as catalyst but other catalysts could as well serve. A closed, light-proof, refrigerated vessel is used, permitting operation at 18–20° C. The quantity of chlorine admitted is measured with a flow-meter.

The reaction takes place in three phases:

(a) An induction period lasting about 30 minutes;

(b) A reaction period with abundant release of HCl (efficient phase);

(c) The product to be chlorinated reacts with even greater difficulty to the chlorine; simultaneously with the release of HCl there is a release of chlorine which indicates the end of the operation.

The chlorination terminated, the product is washed in water, in caustic soda, then again in water. Thus the iron chloride and the hydrochloric acid are removed in solution. It is then easy to separate the cyclohexane by a physical method.

The results obtained for the tests made are presented in the following table. In this table, the first column indicates the number of the test, the second the refractive index of the mixture, the third the specific gravity of the mixture, the fourth the % of benzene in the mixture, the fifth the refractive index of cyclohexane after purification, the last the molecular chlorine-benzene ratio used for the test.

Table

| Test No. | Refractive index $n_{23}°$ C. | Specific gravity $d_{23}°$ C. | Percent benzene | Refractive index of purified cyclohexane $n_{23}°$ C. | Molecular ratio, chlorine/benzene |
|---|---|---|---|---|---|
| 1 | 1.4290 | 0.7778 | 5 | 1.4252 | 2/1 |
| 2 | 1.4290 | 0.7775 | 5 | 1.4250 | 2/1 |
| 3 | 1.4363 | 0.7903 | 16 | 1.4253 | 2/1 |
| 4 | 1.4279 | 0.7773 | 4 | 1.4253 | 1.5-2/1 |
| 5 | 1.4272 | 0.7769 | 3.5 | 1.4248 | 4/1 |

These results show that a cyclohexane more than 99% pure (at 23° C. the index of pure cyclohexane is 1.4247, and a cyclohexane index of 1.4248 was able to be obtained) is easily obtained.

A test on a sample containing 5% benzene gave 94.5% cyclohexane after chlorination, that is only a loss of about 0.5% on the product to be purified. This shows all the advantages of the process of this invention in this purification.

I claim:

1. A method of separating a mixture consisting essentially of cyclohexane and benzene wherein the benzene is present in minor proportion, comprising analyzing the mixture to determine quantitatively the quantity of benzene present in the mixture and then quantitatively selectively chlorinating the benzene by passing chlorine into the mixture in the presence of a catalyst comprising ferric chloride in the dark, at ambient temperature, and in ratio of at least about 1.5 mols of chlorine per mol of benzene, and then physically separating the chlorinated benzene from the cyclohexane.

2. A method of separating a mixture consisting essentially of cyclohexane and benzene wherein the benzene is present in minor proportion, comprising analyzing the mixture to determine quantitatively the quantity of benzene present in the mixture, then quantitatively selectively chlorinating the benzene by passing chlorine into the mixture in the presence of a catalyst consisting of ferric chloride resulting from the reaction between iron and chlorine, in the dark, at ambient temperature, and in excess to the benzene in the range of about 1.5 to 4 mols. of chlorine per molar of benzene, and then physically separating the chlorinated benzene from the cyclohexane.

References Cited in the file of this patent

UNITED STATES PATENTS

| 1,741,305 | Jaeger | Dec. 31, 1929 |
| 2,154,049 | Levine et al. | Apr. 11, 1939 |
| 2,415,066 | Ross et al. | Jan. 28, 1947 |

OTHER REFERENCES

Chemistry of Petroleum Derivatives, Ellis, vol. II, Reinhold Publishing Corp., 330 W. 42nd Street, New York, N.Y. (1937), page 778.

Groggins: Unit Processes in Organic Synthesis, 3rd edition (1947), McGraw-Hill Book Co., New York, pp. 195, 196 and 203.